(12) United States Patent
Kalkowski

(10) Patent No.: US 12,543,659 B2
(45) Date of Patent: *Feb. 10, 2026

(54) PLANT POT WITH REMOVABLE BASIN

(71) Applicant: Kristopher John Kalkowski, Las Vegas, NV (US)

(72) Inventor: Kristopher John Kalkowski, Las Vegas, NV (US)

(73) Assignee: Drain Drawer Pots, Inc., Las Vegas, NV (US)

( * ) Notice: Subject to any disclaimer, the term of this patent is extended or adjusted under 35 U.S.C. 154(b) by 10 days.

This patent is subject to a terminal disclaimer.

(21) Appl. No.: 18/669,196

(22) Filed: May 20, 2024

(65) Prior Publication Data

US 2024/0306559 A1 Sep. 19, 2024

Related U.S. Application Data

(63) Continuation-in-part of application No. 17/724,107, filed on Apr. 19, 2022, now Pat. No. 12,022,784.

(60) Provisional application No. 63/176,865, filed on Apr. 19, 2021.

(51) Int. Cl.
*A01G 9/04* (2006.01)
*A01G 9/02* (2018.01)
*A01G 27/00* (2006.01)
*A01G 27/02* (2006.01)

(52) U.S. Cl.
CPC ........... *A01G 9/028* (2013.01); *A01G 27/008* (2013.01); *A01G 27/02* (2013.01); *A01G 9/0302* (2025.01)

(58) Field of Classification Search
CPC ........ A01G 9/042; A01G 9/023; A01G 9/028; A01G 9/0295; A01G 27/02; A01G 27/006; A01G 31/02; A01G 27/008
See application file for complete search history.

(56) References Cited

U.S. PATENT DOCUMENTS

| | | |
|---|---|---|
| 167,790 A | 9/1875 | Sands |
| 1,487,231 A | 3/1924 | Rady |
| 4,175,354 A | 11/1979 | Anderson |
| 5,535,546 A | 7/1996 | Krivonos |
| 6,345,470 B1 | 2/2002 | Slaght |
| 7,093,391 B2 | 8/2006 | Eakin |
| 8,261,486 B2 | 9/2012 | Bissonnette et al. |

(Continued)

FOREIGN PATENT DOCUMENTS

CN 2403230 Y 11/2000
JP 6187842 B1 8/2017

*Primary Examiner* — Trinh T Nguyen
(74) *Attorney, Agent, or Firm* — Dickinson Wright PLLC; Kevin D. Everage

(57) ABSTRACT

A plant pot assembly includes a pot portion having at least one sidewall extending upwardly from a sidewall bottom section to an upper rim and a dividing structure that is spaced between the sidewall bottom section and upper rim. The dividing structure, bottom section, and the at least one sidewall define a basin cavity. A drain aperture allows fluid to flow from a plant's soil into the basin cavity. A basin portion includes a basin floor, a basin front, a basin back, at least one basin sidewall, and an elevated portion for plugging the drain aperture. The at least one sidewall defines an opening in the basin cavity whereby the basin portion may be removably inserted into the basin cavity. A watering accessory for directing water towards the roots of a plant is configured to be removably attached to the upper rim of the pot portion.

20 Claims, 16 Drawing Sheets

(56) References Cited

U.S. PATENT DOCUMENTS

| | | |
|---|---|---|
| 9,185,853 B1 | 11/2015 | Ascherman |
| 9,474,214 B2 | 10/2016 | Cudmore |
| 10,264,735 B2 | 4/2019 | Cudmore |
| 2008/0083163 A1 | 4/2008 | Amsellem et al. |
| 2008/0141586 A1 | 6/2008 | Hong |
| 2015/0007497 A1 | 1/2015 | Delp, II |
| 2018/0014472 A1 | 1/2018 | Guillory |
| 2020/0008374 A1 | 1/2020 | Coleman |
| 2021/0127606 A1 | 5/2021 | Graffius |
| 2021/0251162 A1 | 8/2021 | Wells |
| 2022/0095558 A1 | 3/2022 | Allen |
| 2022/0159913 A1 | 5/2022 | Cook |

PLANT POT WITH REMOVABLE BASIN

CROSS-REFERENCE TO RELATED APPLICATIONS

This application claims priority to U.S. application Ser. No. 17/724,107, filed Apr. 19, 2022, and which claims priority to U.S. provisional application Ser. No. 63/176,865, filed Apr. 19, 2021, the entirety of each of which is incorporated herein by reference.

TECHNICAL FIELD

This disclosure relates to a plant pot assembly and, in particular, to a plant pot assembly with a removable basin.

BACKGROUND

This section provides background information related to the present disclosure which is not necessarily prior art.

Nature provides one of the most captivating and effective mood enhancements. People have traditionally traveled to various geographies to experience various-types of alluring flora and fauna. In addition to mood enhancement, many types of plants include fruits, seeds, and other portions that are edible and rich in healthy nutrients.

Many individuals also enjoy the processes of cultivating their own plants in controlled or semi-controlled environments. One common device that is used internationally is a plant pot. Plant pots can be constructed from a variety of materials e.g., synthetic, clay. Plant pots, particularly those used in indoor environments, typically include a bowl portion that contains soil and a basin portion that the bowl portion can seat within. The bowl portion includes a bottom with a hole such that, in use, water can be placed in the bowl portion to sufficiently wet the roots and can slowly leak out of the hole and into the basin to ensure the plant is not overwatered. While plant pots with both the bowl and the basin portion have enabled many individuals to grow and sustain plants indoors, they are not without shortcomings. For example, emptying the basin of excess water requires lifting and removal of the plant pot and carrying of the basin to where it can be emptied. Thus emptying the basin can be time consuming, messy, and require lifting the plant pot, which can be very heavy.

Accordingly, there is a continued interest in the development of the plant pots with basins, such that the plant can be easily and efficiently watered and the basin can be easily removed for emptying.

SUMMARY

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

According to one aspect of the disclosure, a plant pot assembly is provided. The plant pot assembly includes a pot portion including at least one sidewall extending upwardly from a sidewall bottom section to an upper rim, and a dividing structure spaced between the sidewall bottom section and upper rim. The dividing structure, upper rim, and sidewalls define a soil cavity. The dividing structure, bottom section, and the at least one sidewall define a basin cavity. The dividing structure defines a drain aperture connecting the soil cavity and the basin cavity. The plant pot assembly further comprises a basin portion including a basin floor, a basin front, a basin back, at least one basin sidewall, a guiding wall and a drain aperture plug apparatus including a plug member extending from the guiding wall. The at least one sidewall defines an opening in the basin cavity whereby the basin portion is removably inserted into the basin cavity. In a first basin position in which the basin portion is disposed within the basin cavity, the basin front is recessed relative to the at least one sidewall and the plug member contacts the drain aperture such that a fluid in the soil cavity may not pass between the soil cavity and the basin cavity. In a second basin position in which the basin portion is also disposed within the basin cavity, the basin front is flush with the at least one sidewall and the plug member does not contact the drain aperture such that a fluid in the soil cavity may pass between the soil cavity and the basin cavity through the drain aperture. A watering accessory configured to be removably attached to the upper rim of the pot portion.

According to one aspect of the disclosure, a plant pot assembly is provided. The plant pot assembly includes a pot portion including at least one sidewall extending upwardly from a sidewall bottom section to an upper rim, and a dividing structure spaced between the sidewall bottom section and upper rim. The dividing structure, upper rim, and sidewalls define a soil cavity. The dividing structure, bottom section, and sidewalls define a basin cavity. The dividing structure defines a drain aperture connecting the soil cavity and the basin cavity. A basin portion includes a basin floor, a basin front, a basin back, at least one basin sidewall, and a guiding wall with an elevated portion. The at least one sidewall defines an opening in the basin cavity whereby the basin portion is removably inserted into the basin cavity. A drain plug apparatus is connected to the dividing structure and is configured to selectively plug the drain aperture. In a first basin position in which the basin portion is disposed within the basin cavity, the basin front is recessed relative to the at least one sidewall and the elevated portion contacts the drain plug apparatus such that the drain plug apparatus plugs the drain aperture and a fluid in the soil cavity may not pass between the soil cavity and the basin cavity. In a second basin position in which the basin portion is also disposed within the basin cavity, the basin front is flush with the at least one sidewall and the elevated portion does not cause the drain plug apparatus to plug the drain aperture such that a fluid in the soil cavity may pass between the soil cavity and the basin cavity through the drain aperture.

According to one aspect of the disclosure, a plant pot assembly is provided. The plant pot assembly includes a pot portion including at least one sidewall extending upwardly from a base to an upper rim and a dividing structure spaced between the base and the upper rim. The dividing structure, the base, and the at least one sidewall define a basin cavity. The dividing structure defines a drain aperture in fluid communication with the basin cavity. A basin portion includes a basin floor, a basin front, a basin back, at least one basin sidewall, and an elevated portion. The at least one sidewall defines an opening in the basin cavity whereby the basin portion may be removably inserted into the basin cavity. In a first basin position in which the basin portion is disposed within the basin cavity, the elevated portion contacts the drain aperture such that a fluid cannot pass into the basin cavity. In a second basin position in which the basin portion is also disposed within the basin cavity, the elevated portion does not contact the drain aperture such that a fluid can pass into the basin cavity through the drain aperture.

According to one aspect of the disclosure, a plant pot assembly is provided. The plant pot assembly includes a pot portion including at least one sidewall extending upwardly from a base to an upper rim and a dividing structure spaced between the base and the upper rim. The dividing structure, the base, and the at least one sidewall define a basin cavity. The dividing structure defines at least one drain aperture in fluid communication with the basin cavity. A basin portion includes a basin floor, a basin front, a basin back having a spouted portion, at least one basin sidewall, and an elevated portion. The at least one sidewall defines an opening in the basin cavity whereby the basin portion may be removably inserted into the basin cavity. In a first basin position in which the basin portion is disposed within the basin cavity, the elevated portion contacts the drain aperture such that a fluid cannot pass into the basin cavity. In a second basin position in which the basin portion is also disposed within the basin cavity, the elevated portion does not contact the drain aperture such that a fluid can pass into the basin cavity through the drain aperture. The pot portion may comprise a plurality of tabs affixed to the inner sidewall of the pot portion and to an upper surface of the dividing structure, extending toward the top of the sidewall, to support another plant pot assembly which may be removably stacked inside the plant pot assembly. The pot portion may include a removable watering accessory for directing water to a lower, soil cavity of the pot portion. The removable watering accessory may comprise a plurality of minor holes at the lower portion of the removable watering accessory through which the water flows into the soil cavity. The removable watering accessory may further comprise at least one major hole configured to receive the elevated portion to removably secure the removable watering accessory in the basin portion for storage.

According to one aspect of the disclosure, a plant pot platform assembly is provided. The plant pot platform assembly includes a platform portion including at least one sidewall extending upwardly from a base to an upper rim and a dividing structure spaced between the base and the upper rim. The dividing structure, the base, and the at least one sidewall define a basin cavity. The dividing structure defines at least one drain aperture in fluid communication with the basin cavity. The dividing structure further defines at least one gasket that forms a water-tight seal with any plant pot of the user's choice. The user's plant pot is placed directly on top of the plant pot platform assembly such that the plant pot rests upon the dividing structure. The gasket contacts the plant pot to form a water-tight seal around the plant pot, such that all water that flows through the plant pot will be directed into and through the drain aperture. A basin portion includes a basin floor, a basin front, a basin back having a spouted portion, at least one basin sidewall, and an elevated portion. The at least one sidewall defines an opening in the basin cavity whereby the basin portion may be removably inserted into the basin cavity. In a first basin position in which the basin portion is disposed within the basin cavity, the elevated portion contacts the drain aperture such that a fluid cannot pass into the basin cavity. In a second basin position in which the basin portion is also disposed within the basin cavity, the elevated portion does not contact the drain aperture such that a fluid can pass into the basin cavity through the drain aperture.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The disclosure is best understood from the following detailed description when read in conjunction with the accompanying drawings. It is emphasized that, according to common practice, the various features of the drawings are not to-scale unless otherwise indicated. Thus, unless otherwise indicated, the dimensions of the various features are arbitrarily expanded or reduced for clarity.

DETAILED DESCRIPTION

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, plant pots, particularly those used in indoor environments, typically include a bowl portion that contains soil and a basin portion that the bowl portion can seat within. The bowl portion includes a bottom with a hole such that, in use, water can be placed in the bowl portion to sufficiently wet the roots and can slowly leak out of the hole and into the basin to ensure the plant is not overwatered. While plant pots with both the bowl and the basin portion have enabled many individuals to grow and sustain plants indoors, they are not without shortcomings. For example, emptying the basin of excess water requires lifting and removal of the plant pot and carrying of the basin where it can be emptied. Thus emptying the basin can be time consuming, messy, and require lifting the plant pot, which can be very heavy.

Accordingly, plant pot assemblies, such as those described herein, configured to provide a structure wherein plants can be easily and efficiently watered and a basin component can be easily removed for emptying, may be desirable. In some embodiments, the plant pot assembly described herein may be configured to provide a structure with an easily removable basin and a chimney feature to ease watering.

Figure 1A:
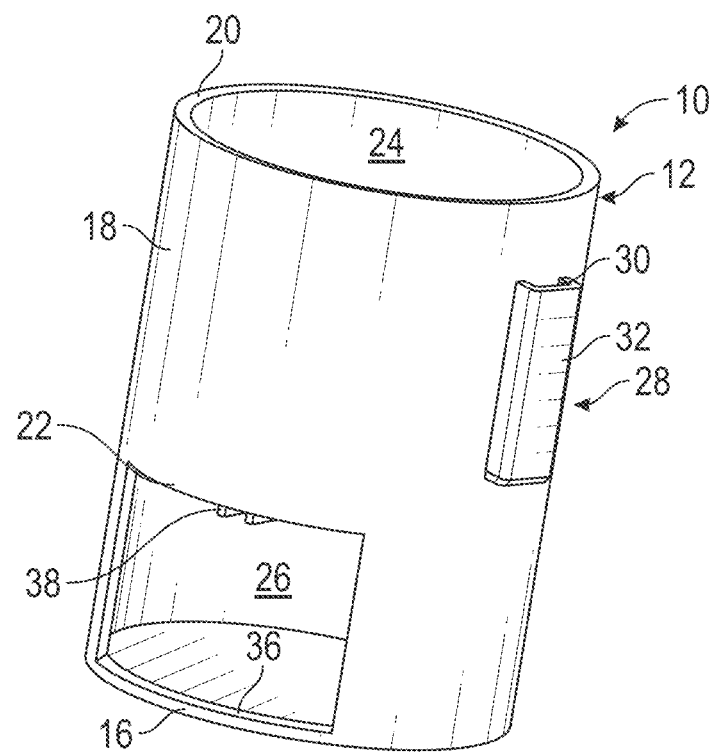
FIGS. 1A and 1B are perspective illustrations of first and second embodiments of plant pot assemblies, each including a basin removed therefrom in accordance with a first embodiment of the disclosure.
Figure 1A:
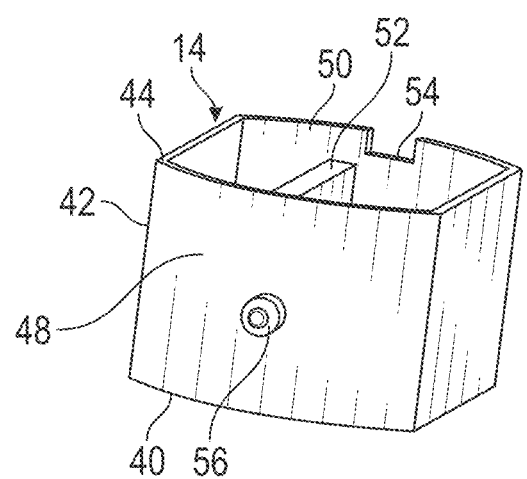
Figure 2:
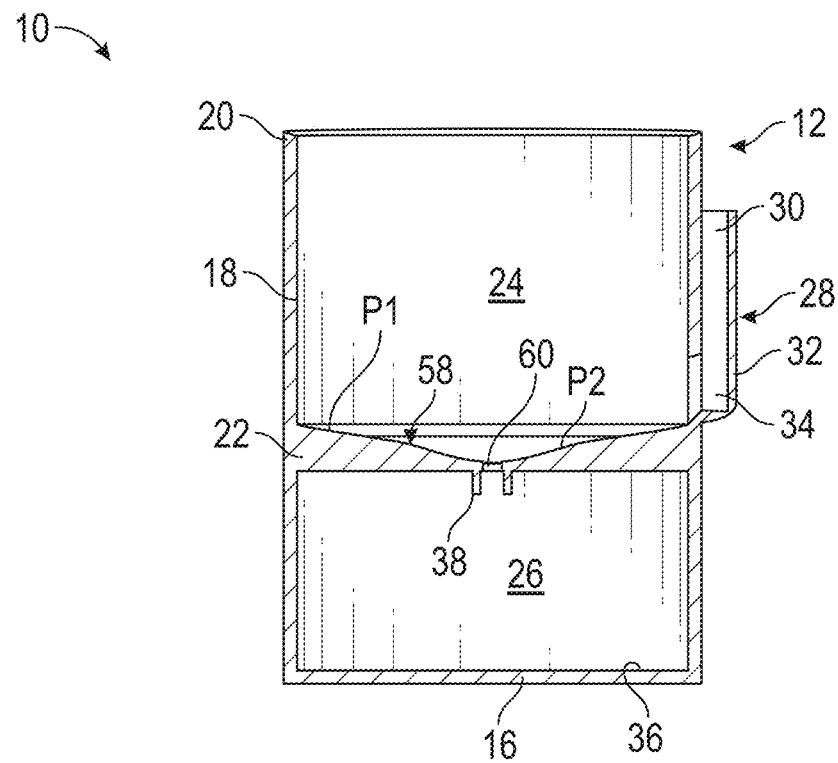
FIG. 2 is a front, cross-sectional illustration of the plant pot assembly in accordance with the first embodiment.

FIG. 1A illustrates a perspective view of a plant pot assembly 10 according to a first embodiment of the present disclosure. Unless otherwise indicated, the first embodiment may share all of the same features, elements, materials of construction, and functionalities of the other embodiments described herein. The plant pot assembly 10 may include any number of shapes and configurations and may be constructed out of any number of materials such as synthetic, clay, glass, or combinations thereof. The plant pot assembly 10 includes a pot portion 12 and a basin portion 14 selectively received within the pot portion 12. More particularly, the pot portion 12 includes a base 16 and at least one sidewall 18 extending upwardly from the base 16 to an upper rim 20. The at least one sidewall 18 may define a cylindrical shape. A dividing structure 22 is spaced between the base 16 and the upper rim 20. A soil cavity 24 is defined between the at least one sidewall 18, the dividing structure 22, and the upper rim 20. A basin cavity 26 is defined between the at least one sidewall 18, the dividing structure 22, and the base 16. A chimney 28 includes an entry port 30 and a body 32 that extends down to an exit port 34 (FIG. 2). In some embodiments, the exit port 34 is located closer to the dividing structure 22 than the entry port 30. In some embodiments, the entry port 30 is flush with the upper rim 20 or located closer to the upper rim 20 than the dividing structure 22. In some embodiments, the chimney 28 is integral with the at least one sidewall 18.

With continued reference to FIG. 1A, the at least one sidewall 18 defines an opening 36 in the basin cavity 26 sized to permit the basin portion 14 to be placed into and removed from the basin cavity 26. An undersurface of the dividing structure 22 includes a first guiding structure, for example, at least one rail 38 for aligning the basin portion 14 within the basin cavity 26. In some embodiments, the at least one rail 38 includes a pair of rails 38 parallelly aligned and defining a guiding track therebetween. In some embodiments, the first guiding structure may be located on the sidewall 18, the base 16, the dividing structure 22, or combinations thereof. In some embodiments, the first guiding structure may include a groove, a shaped surface, or a combination thereof.

The basin portion 14 includes a basin floor 40 and at least one basin sidewall 42 extending up from the basin floor 40 to a basin rim 44. The basin floor 40 and the at least one basin sidewall 42 define a water cavity 46 that collects excess water from the soil cavity 24. The at least one basin sidewall 42 defines a basin front 48 and a basin back 50 spaced oppositely from the basin front 48. In some embodiments, the basin front 48 has a shape that is continuous with the at least one sidewall 18 of the pot portion 12. For example, the basin front 48 and the at least one sidewall 18 of the pot portion 12 may define a circular, oblong, triangular, hexagonal, rectilinear, or other contiguous cross-sectional shapes.

The basin portion 14 includes a second guiding structure, for example, at least one guiding wall 52 that extends between the basin front 48 and the basin back 50. The guiding wall 52 may be sized to fit between and be guided by the pair of rails 38. In some embodiments, the guiding wall 52 extends from the basin front 48 and terminates before reaching the basin back 50. In some embodiments, the guiding wall 52 extends from the basin front 48 to the basin back 50. In some embodiments, the second guiding structure may by located on an under surface of the basin floor, on the basin sidewall 42, or a combination thereof. In some embodiments, the guiding wall 52 is flush with the basin rim 44 and extends to the basin floor 40. The basin portion 14 may further include a cutout 54 for accommodating the first guiding structure (e.g., rails 38). In some embodiments, the cutout 54 is sized to be similarly sized to an outer surface of the pair of rails 38 such that it further assists in guiding the basin portion 14 into the basin cavity 26. In some embodiments, the cutout 54 is sized to permit roots to travel out of the cutout 54 as the basin portion 14 is removed from the basin cavity 26. An outer surface of the basin front 48 may include a handle 56 to assist in the removal and entry of the basin portion 14 relative to the basin cavity 26. The handle 56 may be interchangeable with various different types of handles 56 based on a user's preference.

Figure 1B:
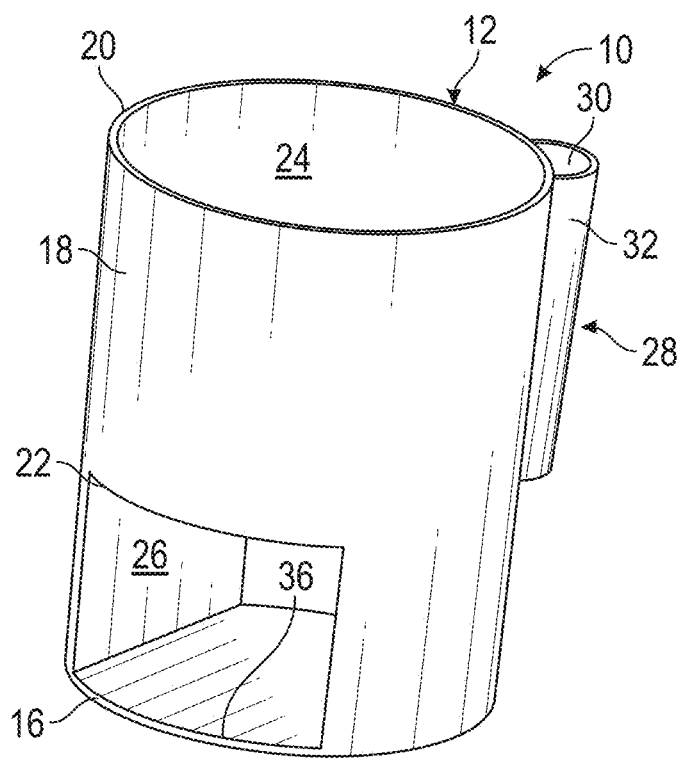
Figure 1B:
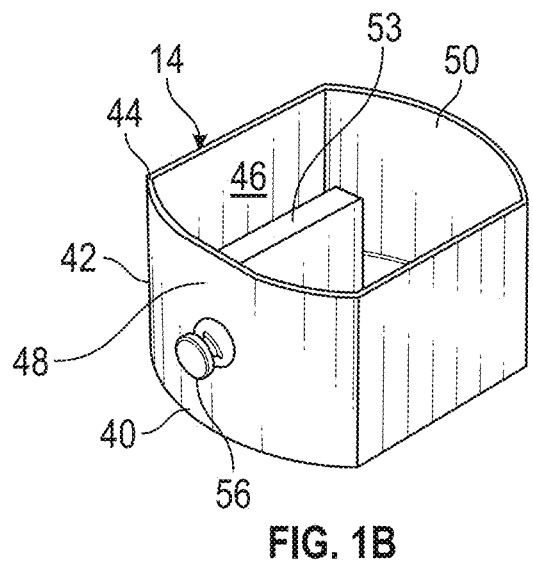

FIG. 1B illustrates a perspective view of a plant pot assembly 10 according to a second embodiment of the present disclosure. Unless otherwise indicated, the second embodiment may share all of the same features, elements, materials of construction, and functionalities of the other embodiments described herein. The plant pot assembly 10 may include any number of shapes and configurations and may be constructed out of any number of materials such as synthetic, clay, glass, or combinations thereof. The plant pot assembly 10 includes a pot portion 12 and a basin portion 14 selectively received within the pot portion 12. More particularly, the pot portion 12 includes a base 16 and at least one sidewall 18 extending upwardly from the base 16 to an upper rim 20. The at least one sidewall 18 may define a cylindrical shape. A dividing structure 22 is spaced between the base 16 and the upper rim 20. A soil cavity 24 is defined between the at least one sidewall 18, the dividing structure 22, and the upper rim 20. A basin cavity 26 is defined between the at least one sidewall 18, the dividing structure 22, and the base 16. A chimney 28 includes an entry port 30 and a body 32 that extends down to an exit port 34 (FIG. 2). In some embodiments, the exit port 34 is located closer to the dividing structure 22 than the entry port 30. In some embodiments, the entry port 30 is flush with the upper rim 20 or located closer to the upper rim 20 than the dividing structure 22. In some embodiments, the chimney 28 is integral with the at least one sidewall 18.

With continued reference to FIG. 1B, the at least one sidewall 18 defines an opening 36 in the basin cavity 26 sized to permit the basin portion 14 to be placed into and removed from the basin cavity 26. In some embodiments, the first guiding structure may be located on the sidewall 18, the base 16, the dividing structure 22, or combinations thereof. In some embodiments, the first guiding structure may include a groove, a shaped surface, or a combination thereof.

The basin portion 14 includes a basin floor 40 and at least one basin sidewall 42 extending up from the basin floor 40 to a basin rim 44. The basin floor 40 and the at least one basin sidewall 42 define a water cavity 46 that collects excess water from the soil cavity 24. The at least one basin sidewall 42 defines a basin front 48 and a basin back 50 spaced oppositely from the basin front 48. In some embodiments, the basin front 48 has a shape that is continuous with the at least one sidewall 18 of the pot portion 12. For example, the basin front 48 and the at least one sidewall 18 of the pot portion 12 may define a circular, oblong, triangular, hexagonal, rectilinear, or other contiguous cross-sectional shapes.

The basin portion 14 may include a central wall 53 that extends between the basin front 48 and the basin back 50. In some embodiments, the central wall 53 extends from the basin front 48 and terminates before reaching the basin back 50. In some embodiments, the central wall 53 extends from the basin front 48 to the basin back 50. In some embodiments, the second guiding structure may by located on an under surface of the basin floor, on the basin sidewall 42, or a combination thereof. In some embodiments, the guiding wall 52 is flush with the basin rim 44 and extends to the basin floor 40. An outer surface of the basin front 48 may include a handle 56 to assist in the removal and entry of the basin portion 14 relative to the basin cavity 26.

Figure 3:
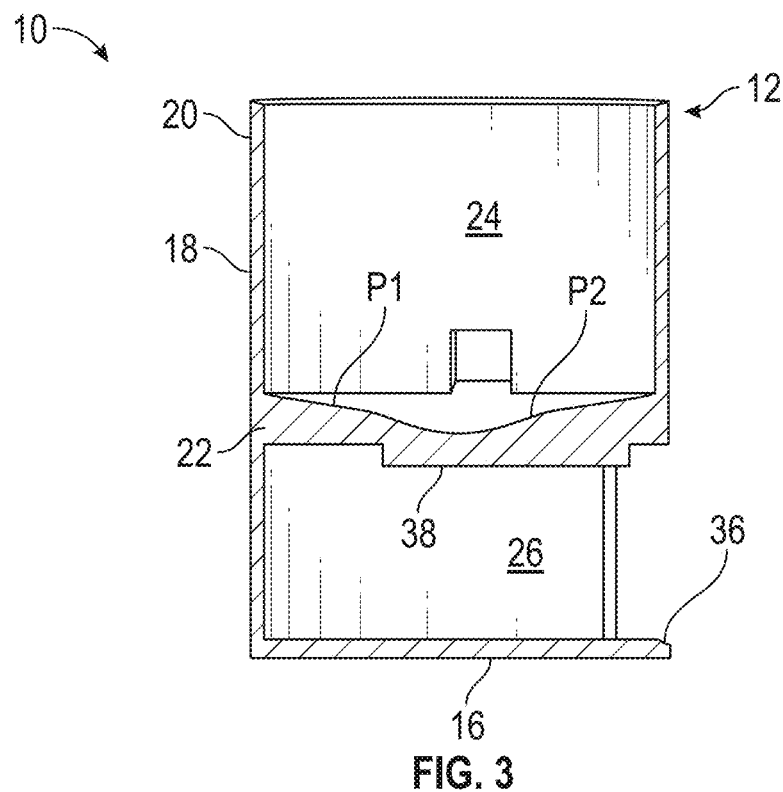
FIG. 3 is a side, cross-sectional illustration of the plant pot assembly in accordance with the first embodiment.

FIG. 2 is a front, cross-sectional view of the plant pot assembly 10 in accordance with the first embodiment illustrating additional features. More particularly, a top surface of the dividing structure 22 that faces the rim 20 includes a depression 58 that depresses from the at least one sidewall 18 to a central location that defines a drain aperture 60. In use, the depression 58 guides liquid on the top surface of the dividing structure 22 to the drain aperture 60 to prevent accumulation that can be harmful to plants. In some embodiments, the depression 58 includes a first pitch P1 located adjacent to the at least one sidewall and a second pitch P2 located around and adjacent to the drain aperture 60. In some embodiments, the first pitch P1 is less than the second pitch P2. In some embodiments, the depression 58 defines a concave surface with at least one section of a continuously variable pitch and/or arch-shaped pitch. FIG. 3 is a side, cross-sectional illustration of the pot portion 12 illustrating the location of the rails 38. More particularly, the rails 38 may extend towards but terminate in a spaced relationship from the opening 36. The spacing between the rails 38 and the opening 36 may be equal or substantially equal to a thickness of the basin sidewall 48 defining the basin front 42, such that the basin front 48 is flush with an outer surface of the at least one sidewall 18 of the pot portion 12.

Figure 4:
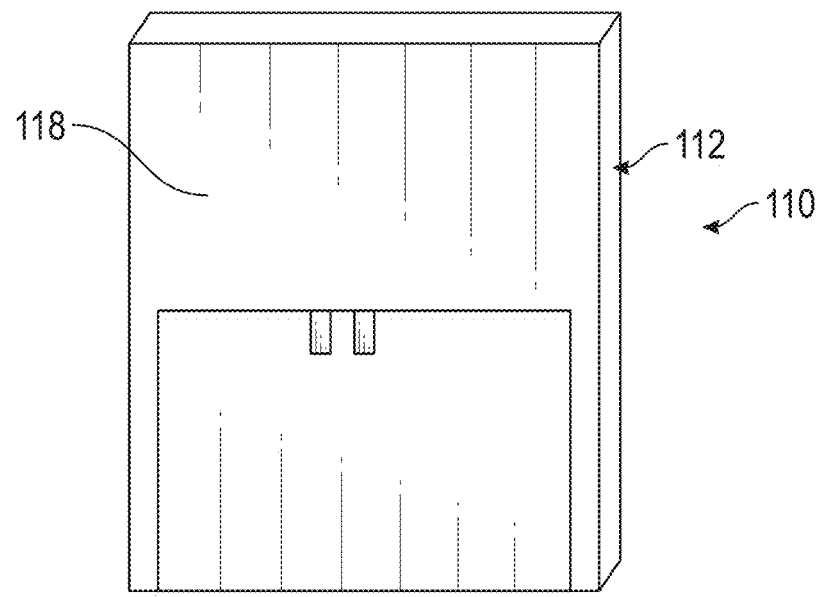
FIG. 4 is a perspective illustration of a plant pot assembly including a basin removed therefrom in accordance with a second embodiment of the disclosure.
Figure 4:
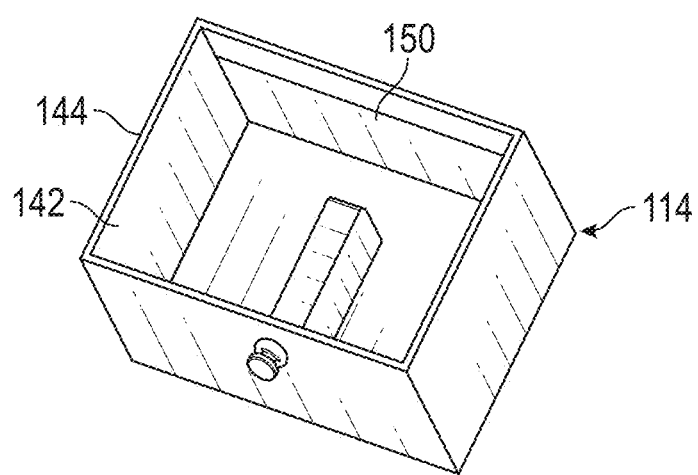

FIG. 4 is a perspective illustration of a plant pot assembly 110 in accordance with a second embodiment of the disclosure. Unless otherwise indicated, the second embodiment may share all of the same features, elements, materials of construction, and functionalities of the other embodiments described herein. The plant pot assembly 110 includes a pot portion 112 and a basin portion 114. The pot portion 112 may include a sidewall 118 defining a cube or cuboid shape and the basin portion 114 may likewise include a basin sidewall 142 defining a cube or cuboid shape. In some embodiments, a basin back surface 150 adjacent to a basin rim 144 is recessed for accommodating a first guiding structure and/or roots.

Figure 5:
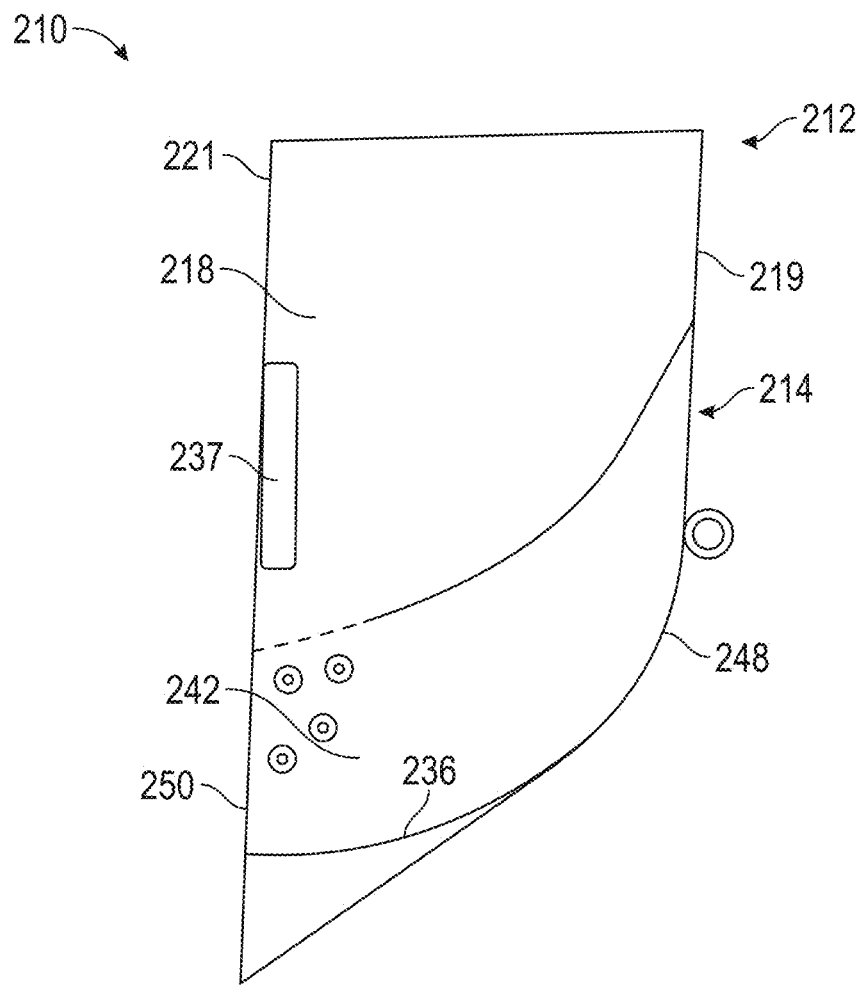
FIG. 5 is a side illustration of a plant pot assembly including a basin therein in accordance with a third embodiment of the disclosure.

FIG. 5 is a side illustration of a plant pot assembly 210 in accordance with a third embodiment of the disclosure. Unless otherwise indicated, the third embodiment may share all of the same features, elements, materials of construction, and functionalities of the other embodiments described herein. The plant pot assembly 210 includes a pot portion 212 and a basin portion 214. The pot portion 212 may include a sidewall 218 defining a curved front surface 219 and a flat back surface 221 and the basin portion 214 may likewise include a basin sidewall 242 defining basin front surface 248 that is curved and a basin back surface 250 that is flat. In some embodiments, the at least one sidewall 218 begins to taper at or near a basin opening 236 to a bottom surface. In some embodiments, the plant pot assembly 210 may further include at least one connection feature 237, such as a hook, strap, adhesive, fastener aperture, or combinations thereof. As such, the flat back surface 221 can sit flushly on a wall or other structure and connect thereto with the connection feature 237.

Figure 6:
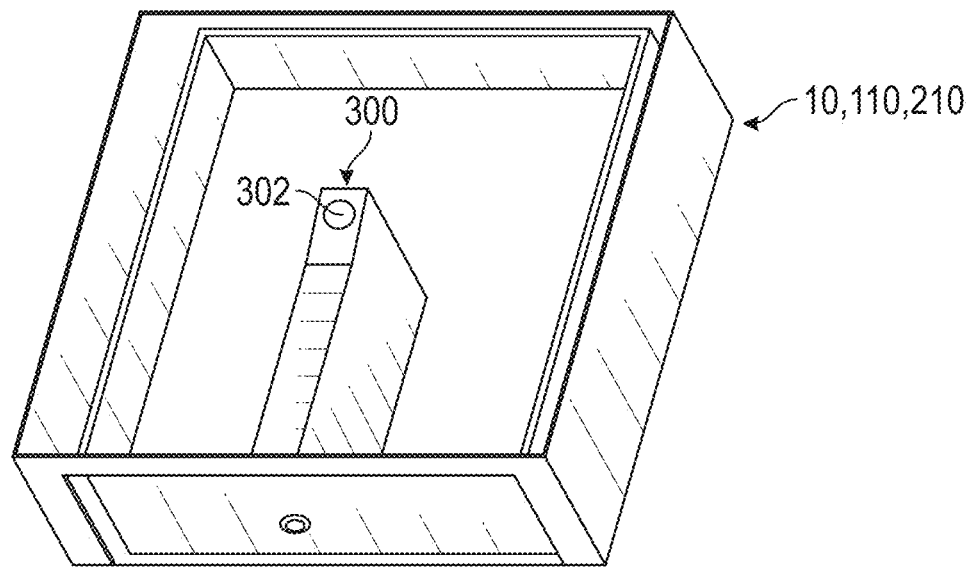
FIG. 6 is a perspective illustration of a basin including a drain aperture plug apparatus in accordance with one embodiment.

FIGS. 6 through 11 illustrate various embodiments of a drain aperture plug apparatus that selectively prevents fluid from flowing from the soil chamber 24 and into the water cavity 46. The various drain aperture plug apparatus may be configured to plug the drain aperture when the basin portion is removed from the pot portion and/or when the basin portion is located in the pot portion. It should be appreciated that the each of the following embodiments of the drain aperture plug apparatus could be implemented in any of the described plant pot assembly embodiments. In some embodiments, the first guiding structure and the second guiding structure may be configured to locate the drain aperture plug apparatus against the drainage aperture. With reference to FIG. 6, a basin including a drain aperture plug apparatus 300 is illustrated in accordance with a first embodiment. The drain aperture plug apparatus 300 includes a plug member 302 extending from a guiding wall of the basin portion towards the drainage aperture. The plug member 302 may be elastic and deformable to seal the drainage aperture. In a first basin position in which the basin portion 14 is disposed within the basin cavity 26, the basin front 48 is recessed relative to the at least one sidewall 18 and the plug member 302 contacts the drainage aperture 60 such that a fluid in the soil cavity 24 may not pass between the soil cavity 24 and the water cavity 46. In a second basin position in which the basin portion 14 is disposed within the basin cavity 26, the basin front 48 is flush with the at least one sidewall 18 and the plug member 302 does not plug the drain aperture 60 such that a fluid in the soil cavity 24 may pass between the soil cavity 24 and the water cavity 46 through the drainage aperture 60.

Figure 7:
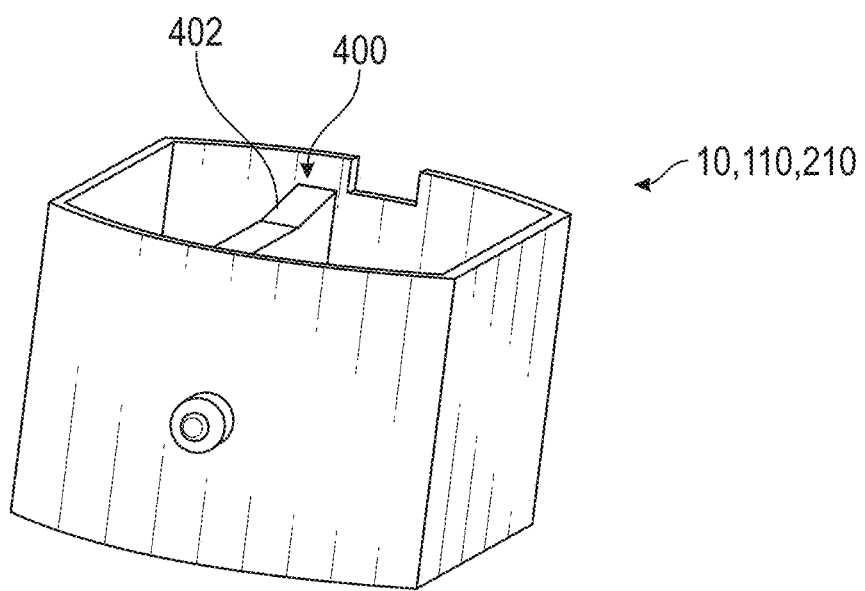
FIG. 7 is a perspective illustration of the basin including a drain aperture plug apparatus in accordance with another embodiment.

FIG. 7 is a perspective illustration of a drain aperture plug apparatus 400 in accordance with a second embodiment. The drain aperture plug apparatus 400 includes an elevated portion 402 extending from a guiding wall of the basin portion towards the drainage aperture. The elevated portion 402 may be elastic and deformable to seal the drainage aperture. In a first basin position in which the basin portion 14 is disposed within the basin cavity 26, the basin front 48 is recessed relative to the at least one sidewall 18 and the elevated portion 402 contacts the drainage aperture 60 such that a fluid in the soil cavity 24 may not pass between the soil cavity 24 and the water cavity 46. In a second basin position in which the basin portion 14 is disposed within the basin cavity 26, the basin front 48 is flush with the at least one sidewall 18 and the elevated portion 402 does not plug the drain aperture 60 such that a fluid in the soil cavity 24 may pass between the soil cavity 24 and the water cavity 46 through the drainage aperture 60.

Figure 8:
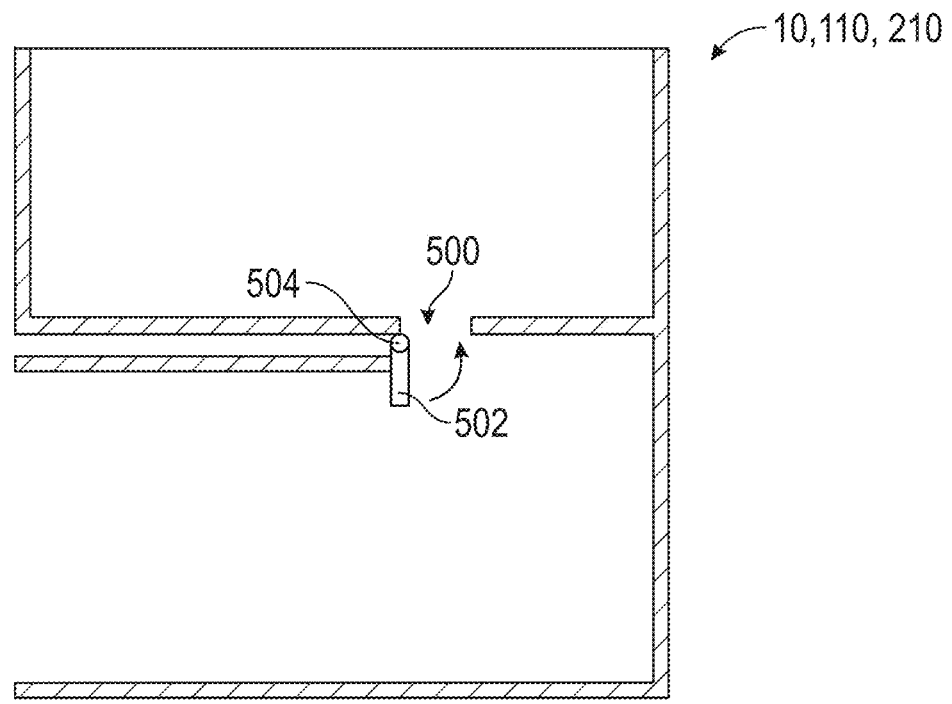
FIG. 8 is a perspective illustration of the basin including a drain aperture plug apparatus in accordance with another embodiment.

FIG. 8 is a perspective illustration of a drain aperture plug apparatus 500 in accordance with a third embodiment. The drain aperture plug apparatus 500 includes a door 502 pivotable on a hinge 504 between an open and closed position and extending from a dividing structure of the pot portion towards the drainage aperture. The door 502 may be elastic and deformable to seal the drainage aperture. In operation, the door 502 may be located adjacent to the first guiding structure (e.g., between rails 38) and as the second guiding structure contacts the door 502, it is pivoted to the closed position wherein the drainage aperture is plugged. In some embodiments, the second guiding structure includes a ramp (e.g., ramped portion 402) such that the rate of drainage can be controlled.

Figure 9:
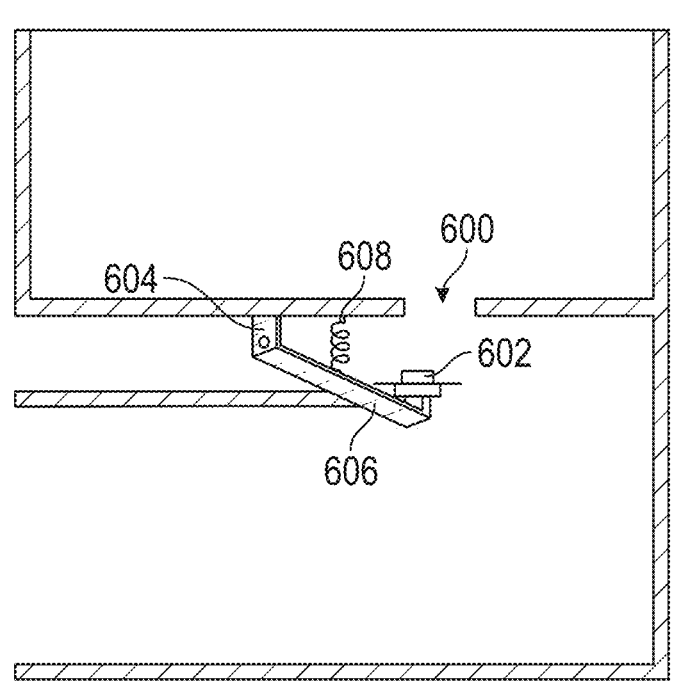
FIG. 9 is a perspective illustration of the basin including a drain aperture plug apparatus in accordance with another embodiment.

FIG. 9 is a perspective illustration of a drain aperture plug apparatus 600 in accordance with a fourth embodiment. The drain aperture plug apparatus 600 includes a plug 602 pivotally connected to a bracket 604 via a linkage 606. A spring 608 may connect the linkage 606 to the pot portion (e.g., dividing structure). The plug 602 may be elastic and deformable to seal the drainage aperture. In operation, the second guiding structure may contact the linkage 606 to lift the plug 602 into the drainage aperture.

Figure 10:
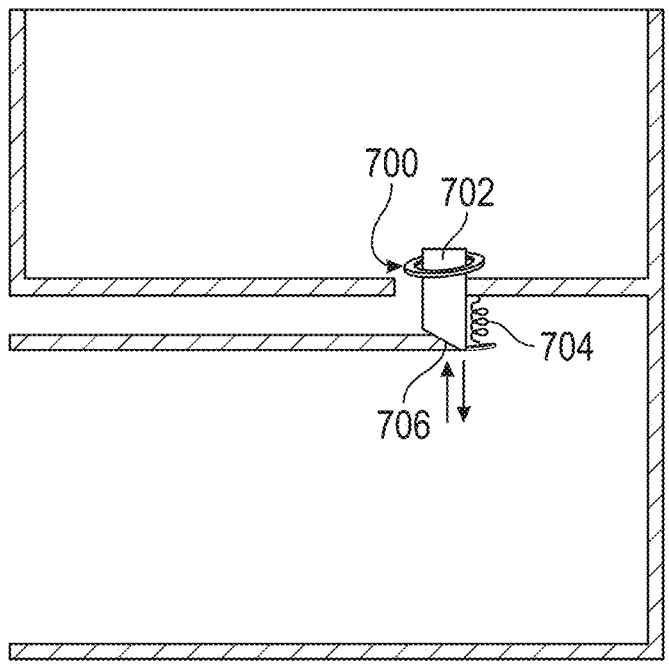
FIG. 10 is a perspective illustration of the basin including a drain aperture plug apparatus in accordance with another embodiment.

FIG. 10 is a perspective illustration of the basin including a drain aperture plug apparatus 700 in accordance with a fifth embodiment. The drain aperture plug apparatus 700 includes a plug 702 biased towards or away from the drain aperture via a spring 704. A bottom surface 706 of the plug 702 is ramped such that contact with the second guiding structure causes the plug 702 to enter or exit the drainage aperture. Thus in some embodiments, the spring 704 biases the plug 702 in the drainage aperture until the bottom surface 706 contacts the second guiding structure and lifts the plug 702 out of the drainage aperture to prevent leakage when the basin portion is removed. In some embodiments, the spring 704 biases the plug 702 away from the drainage aperture until the bottom surface 706 contacts the second guiding structure and lifts the plug 702 into the drainage aperture to prevent leakage when the basin portion is removed.

Figure 11:
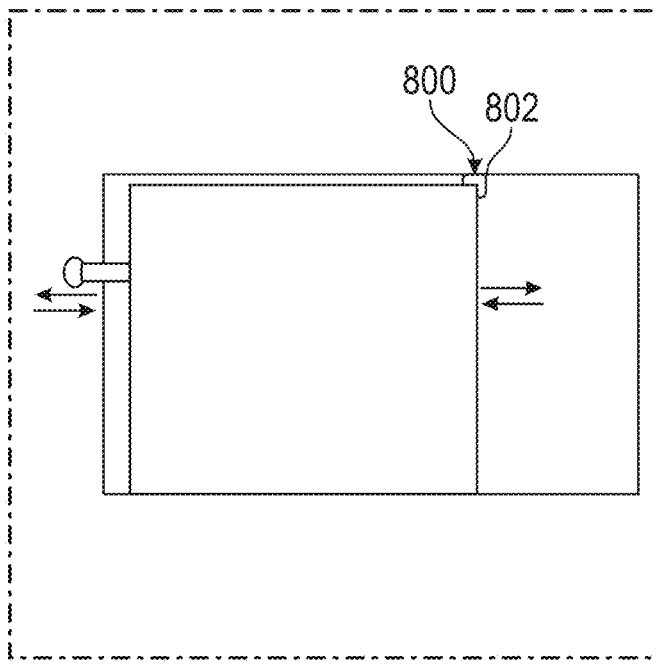
FIG. 11 is a perspective illustration of the basin including a drain aperture plug apparatus in accordance with another embodiment.
Figure 12:
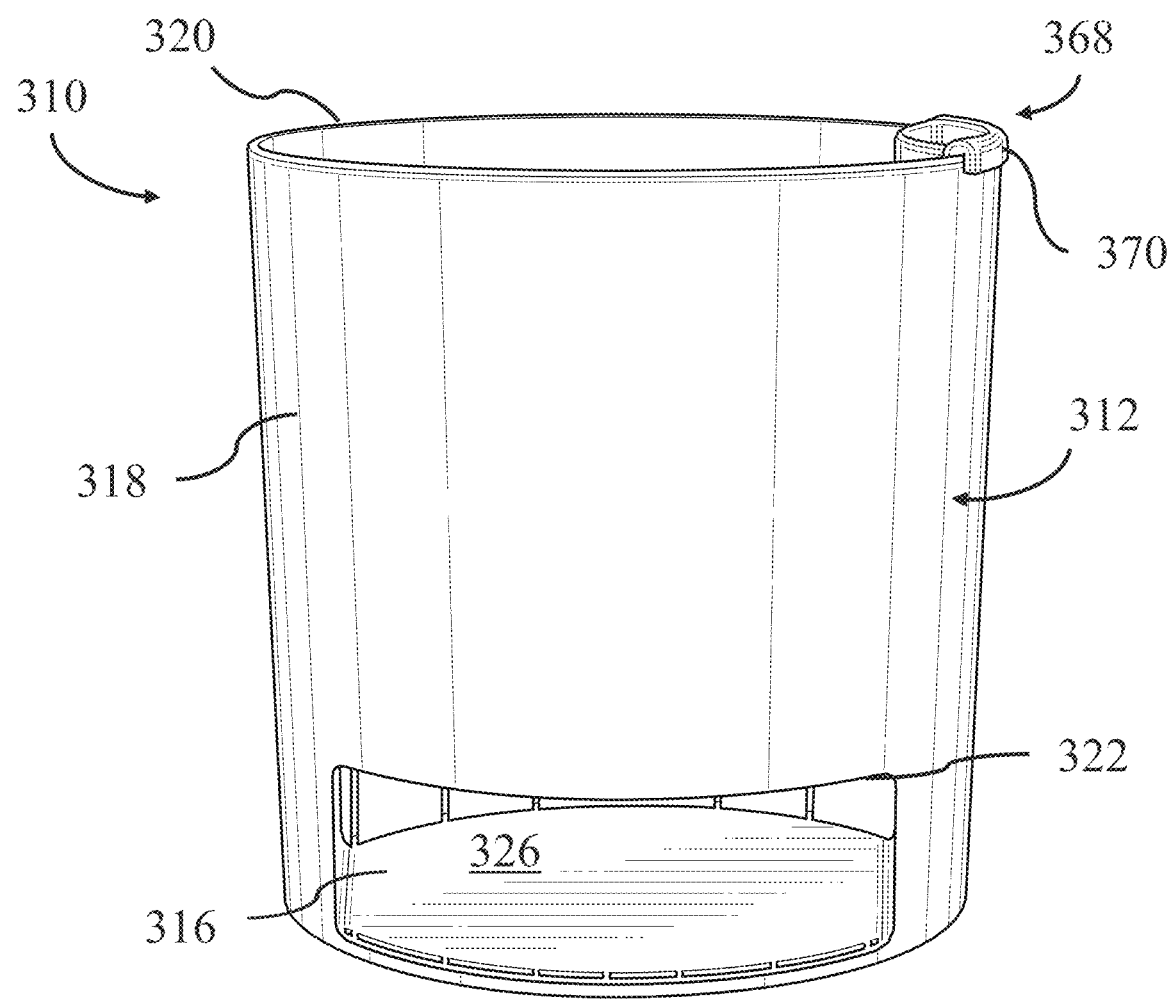
FIG. 12 is a perspective illustration of a plant pot assembly according to a seventh embodiment of the disclosure.
Figure 13:
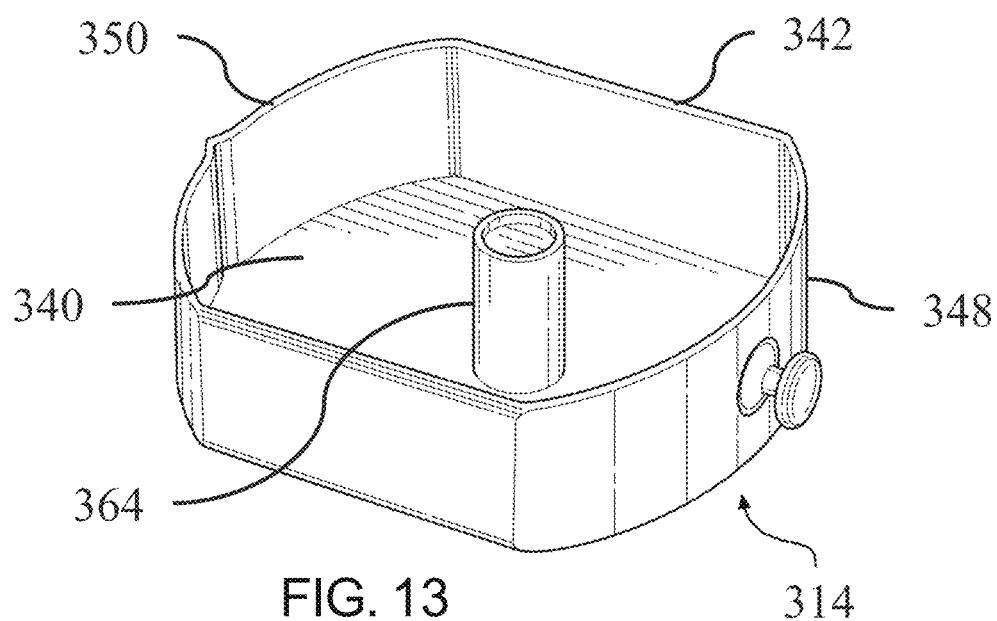
FIG. 13 is a perspective illustration of a basin portion with an elevated portion according to the seventh embodiment.
Figure 14:
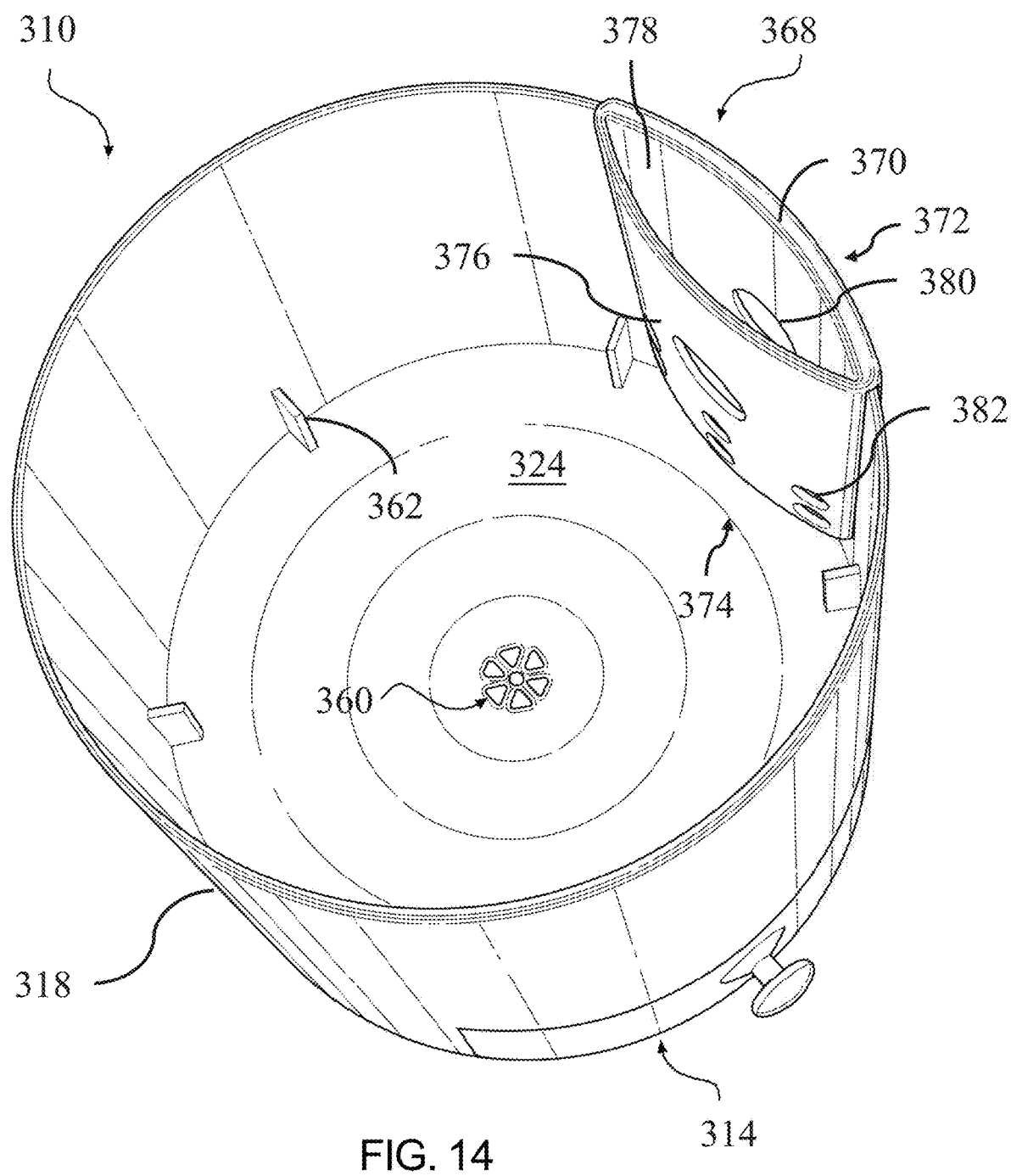
FIG. 14 is a top perspective illustration of the plant pot assembly in accordance with the seventh embodiment.

FIG. 11 is a perspective illustration of the basin including a drain aperture plug apparatus 800 in accordance with a sixth embodiment. The drain aperture plug apparatus 800 includes a sealing member 802 located on the dividing wall. The basin portion may be sized such that the sealing member 802 can be moved forward and rearward of the drainage aperture.

FIGS. 12-18 illustrate a plant pot assembly 310 in accordance with a seventh embodiment of the disclosure. Unless otherwise indicated, the seventh embodiment may share all of the same features, elements, materials of construction, and functionalities of the other embodiments described herein. The plant pot assembly 310 includes a pot portion 312 and a basin portion 314 removably received within the pot portion 312. More particularly, the pot portion 312 includes a base 316 and at least one sidewall 318 extending upwardly from the base 316 to an upper rim 320. The at least one sidewall 318 may define a cylindrical shape. A dividing structure 322 is spaced between the base 316 and the upper rim 320. A soil cavity 324 is defined between the at least one sidewall 318, the dividing structure 322, and the upper rim 320. A basin cavity 326 is defined between the at least one sidewall 318, the dividing structure 322, and the base 316. The at least one sidewall 318 defines an opening 336 sized to permit the basin portion 314 to be placed into and removed from the basin cavity 326.

A drain aperture 360 is defined by openings through the dividing structure 322 and allows fluid flow between the soil cavity 324 and the basin cavity 326. The drain aperture 360 may be disposed centrally, peripherally, or the like. One or more tabs 362 may be disposed inside of the soil cavity 324 and extend upwards toward the upper rim 320. The tabs 362 may be positioned adjacent to or spaced apart from the at least one sidewall 318. The tabs 362 may be configured to support structures placed or stacked within the soil cavity 324, such as other plant pot assemblies, allowing for even weight distribution along the dividing structure 322.

The basin portion 314 includes a basin floor 340 and at least one basin sidewall 342 extending up from the basin floor 340 to a basin rim 344. The basin floor 340 and the at least one basin sidewall 342 define a water cavity 346 that collects excess water passing through the drain aperture 360 from the soil cavity 324. The at least one basin sidewall 342 defines a basin front 348 and a basin back 350 spaced oppositely from the basin front 348. In some embodiments, the basin front 348 has a shape that is continuous with the at least one sidewall 318 of the pot portion 312. For example, the basin front 348 and the at least one sidewall 318 of the pot portion 312 may define a circular, oblong, triangular, hexagonal, rectilinear, or other contiguous cross-sectional shapes. An outer surface of the basin front 348 may include an interchangeable handle 356 to assist in the removal and entry of the basin portion 314 relative to the basin cavity 326.

The basin portion 314 may include an elevated portion 364 that extends upwardly from the basin floor 340 toward the dividing structure 322. The elevated portion 364 is spaced apart from the basin front 348, the basin back, and the at least one basin sidewall 318. For example, the elevated portion 364 may be located centrally within the basin portion 314. The elevated portion 364 may be configured to contact the drain aperture 360 such that fluid in the soil cavity 324 may not pass between the soil cavity 324 and the basin cavity 326. The elevated portion 364 may be elastic and deformable to seal the drainage aperture 360. The elevated portion 364 may include a compressible material 366 that is compressed against the drainage aperture 360 to seal the drainage aperture. In some embodiments, the basin back 350 defines a spout or spout-like end for pouring fluid out of the water cavity 346.

A watering accessory 368 may include a folded edge 370 adjacent to a top end 372 of the watering accessory 368 for removably attaching the watering accessory 368 to the upper rim 320 of the pot portion 312. For example, the folded edge 370 is contoured to the shape of the upper rim 320 such that the watering accessory 368 is securely held in place. The folded edge 370 may be continuous, segmented, or the like. The watering accessory 368 may be removably attached to the upper rim 320 such that a bottom end 374 of the watering accessory is disposed within the soil cavity 324.

The watering accessory 368 includes a front surface 376 connected to a rear surface 378. The front surface 376 and/or the rear surface 378 may be contoured to the shape of the at least one sidewall 318. The front surface 376 and/or the rear surface 378 may include at least one major hole 380 and/or at least one minor hole 382. In some embodiments, the front surface 376 and the rear surface 378 may include major holes 380 that are coaxially aligned. In some embodiments, the front surface 376 and/or the rear surface 378 may include minor holes 382 that are spaced apart from the top end 372, adjacent or proximal to the bottom end 374, or the like. The at least one major hole 380 and/or the at least one minor hole 382 may be distributed, shaped, or positioned such that water can be poured into the watering accessory 368 and flow into the soil cavity 324 via the at least one major hole 380 and/or the at least one minor hole 382. In this way water may be directed to a lower section of the soil cavity 324 where a plant's roots may be positioned, rather than watering the surface or upper section of the plant's soil.

Figure 15:
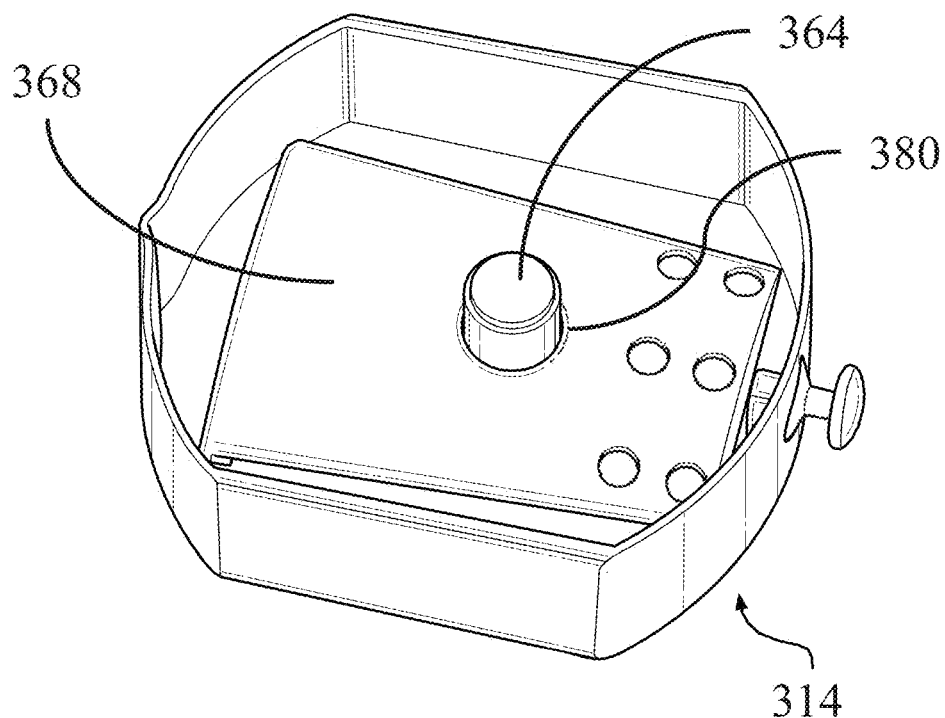
FIG. 15 is a perspective illustration of a watering accessory placed in a basin portion according to the seventh embodiment.
Figure 16:
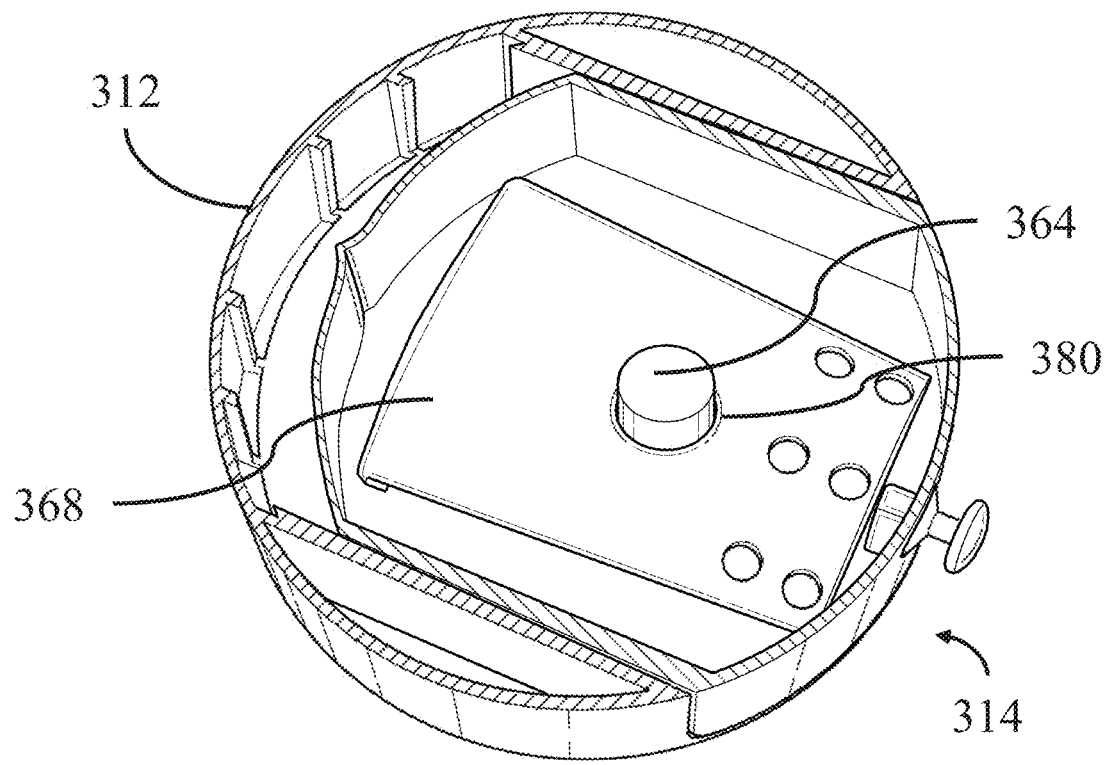
FIG. 16 is a cross-sectional illustration of the watering accessory placed in the basin portion and the basin portion inserted in a basin cavity according to the seventh embodiment.

The watering accessory 368 is configured to be removably placed within the basin portion 314 such that the elevated portion 364 extends through the at least one major hole 380. In some embodiments, the elevated portion 364 extends through the at least one major hole of the front surface 376 and the rear surface 378. The watering accessory may be of a similar or different shape to the water cavity 346 of the basin portion 314. For example, FIGS. 15 and 16 are a perspective view of the watering accessory 368 being stored within the basin portion 314. In particular, FIG. 16 is a cross-sectional view of the basin portion 314 placed within the basin cavity 326.

Figure 17:
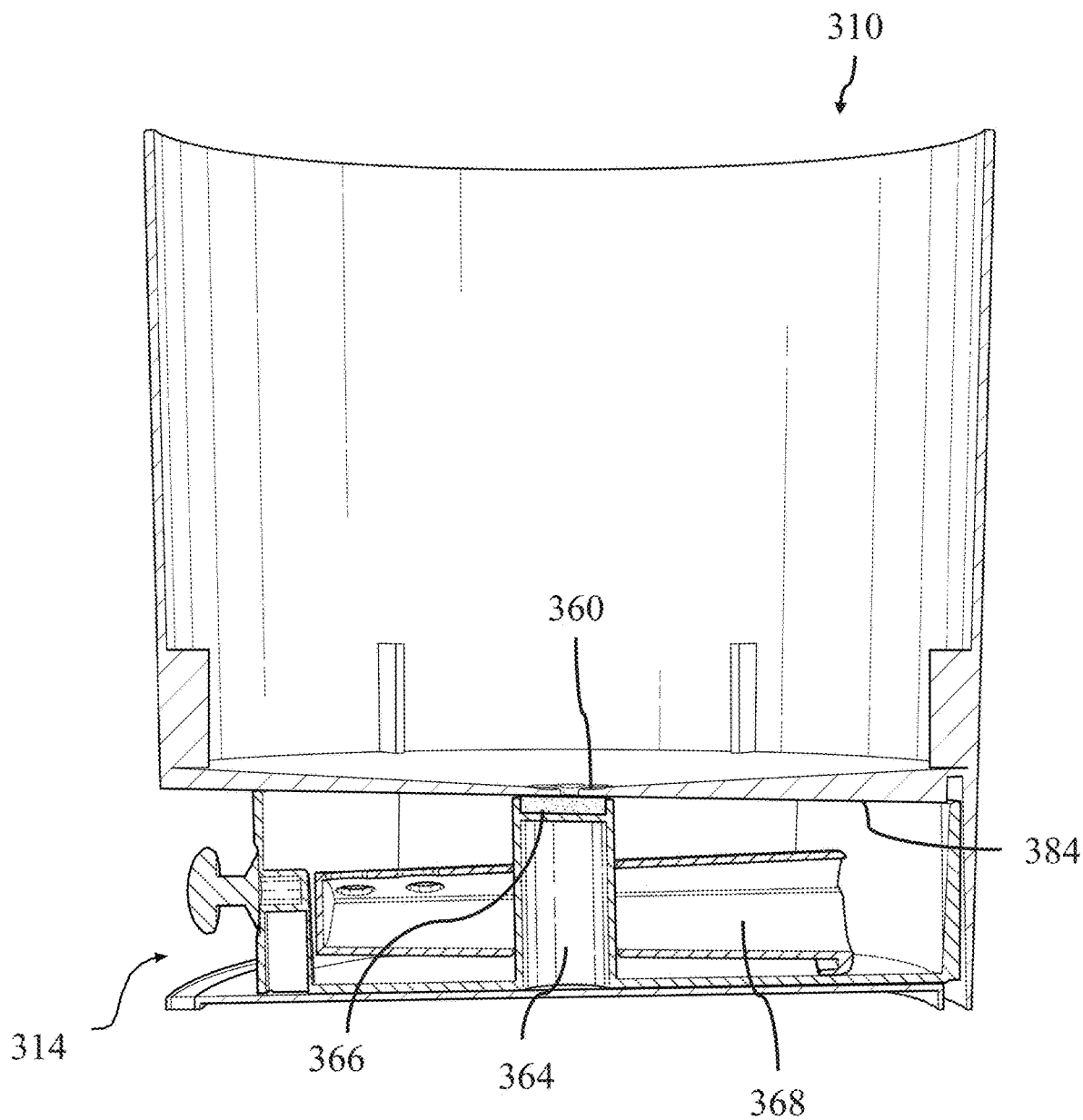
FIG. 17 is a cross-sectional illustration of the plant pot assembly with the basin portion in a first basin position according the seventh embodiment.
Figure 18:
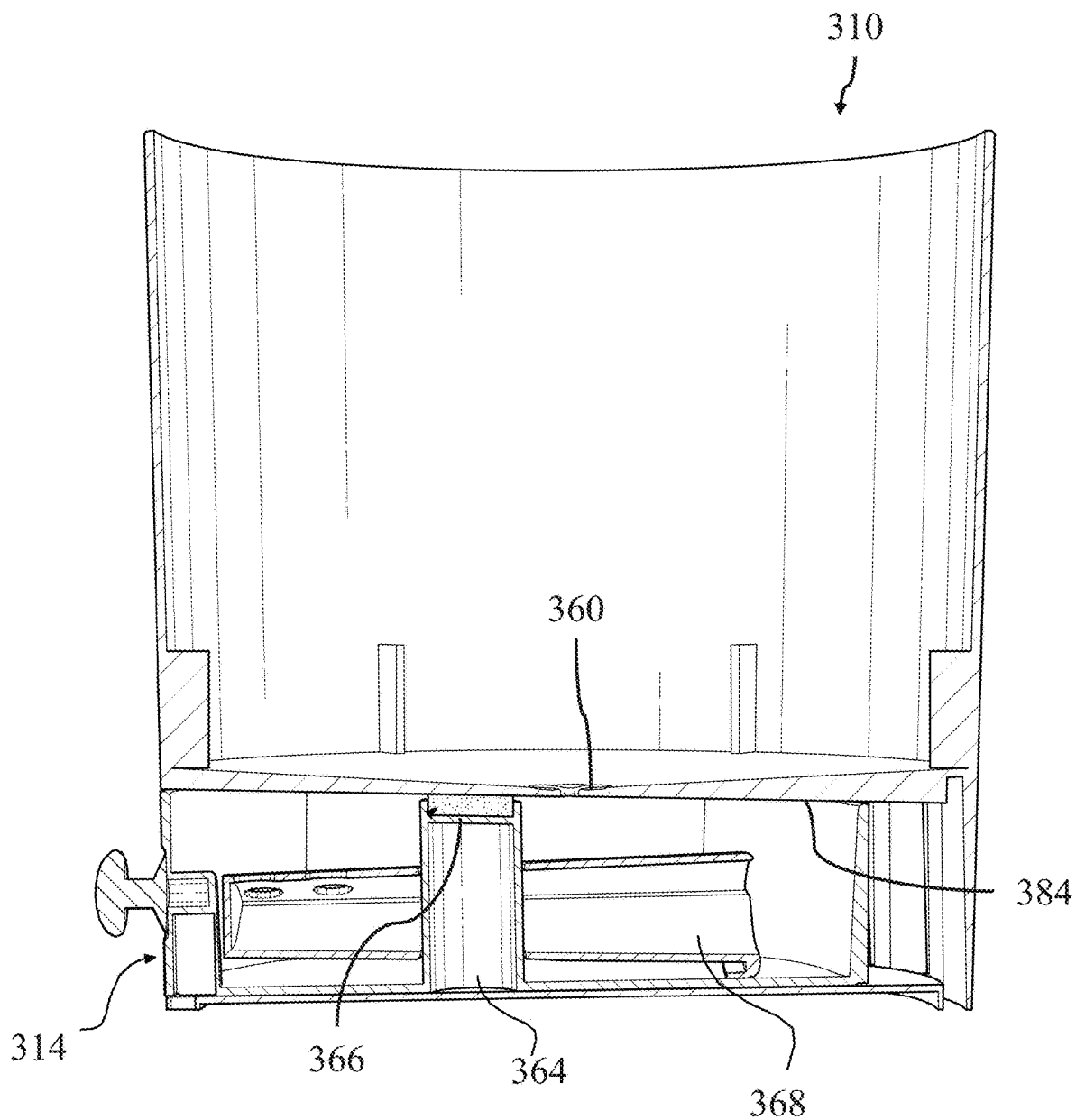
FIG. 18 is a cross-sectional illustration of the plant pot assembly with the basin portion in a second basin portion according the seventh embodiment.

FIGS. 17 and 18 are a cross-sectional view of the plant pot assembly 310 in accordance with the seventh embodiment illustrating additional features. More particularly, a bottom surface 384 of the dividing structure 322 that faces the base 316 is angled downwardly from the at least one sidewall 318 to the drain aperture 360. The bottom surface 384 may be uniformly or disjointedly pitched. The angled nature of the bottom surface 384 allows for the compressible material 366 of the elevated portion 364 to be compressed against the drain aperture 360 when the elevated portion 364 is in contact with the drain aperture 360 and uncompressed when the elevated portion 364 is not in contact with the drain aperture 360. For example, FIG. 17 illustrates the basin portion 314 disposed in a first basin position in the basin cavity 326 such that the elevated portion 364 is in contact with the drain aperture 360 and the compressible material 366 is compressed against the drain aperture 360. FIG. 18 illustrates the basin portion 314 adjusted from the first basin position to the second basin position in the basin cavity 326, such that the elevated portion 364 is not in contact with the drain aperture 360. The basin portion 314 may be adjusted from the first basin position to the second basin position, from the second basin position to the first basin position, a position therebetween, or the like. When the basin portion 314 is in the first basin position the basin front 342 is recessed relative to the at least one sidewall 318. When the basin portion 314 is in the second basin position the basin front 342 is flush with the at least one sidewall 318.

Figure 19:
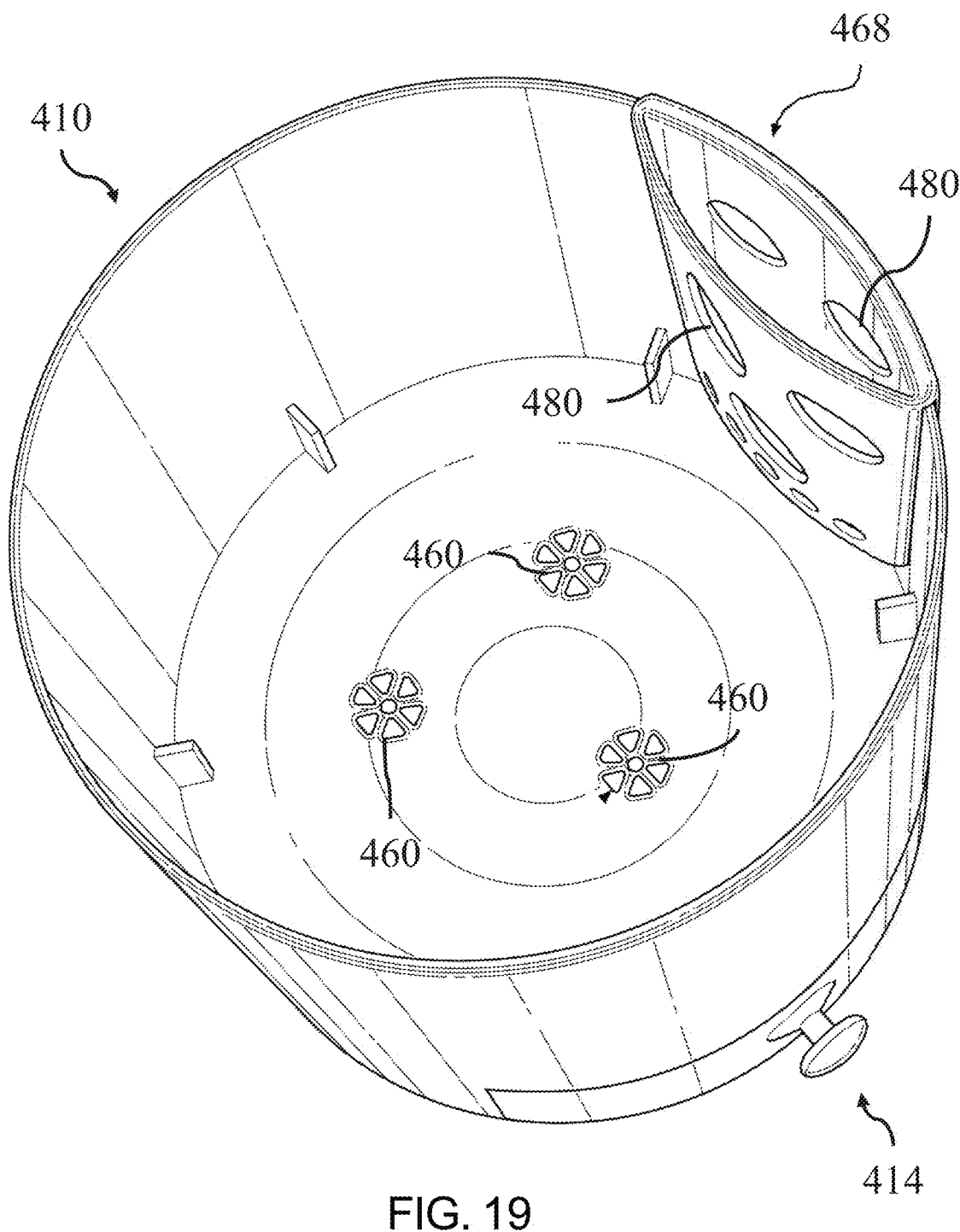
FIG. 19 is a top perspective illustration of a plant pot assembly having a plurality of drain apertures according to an eighth embodiment of the disclosure.
Figure 20:
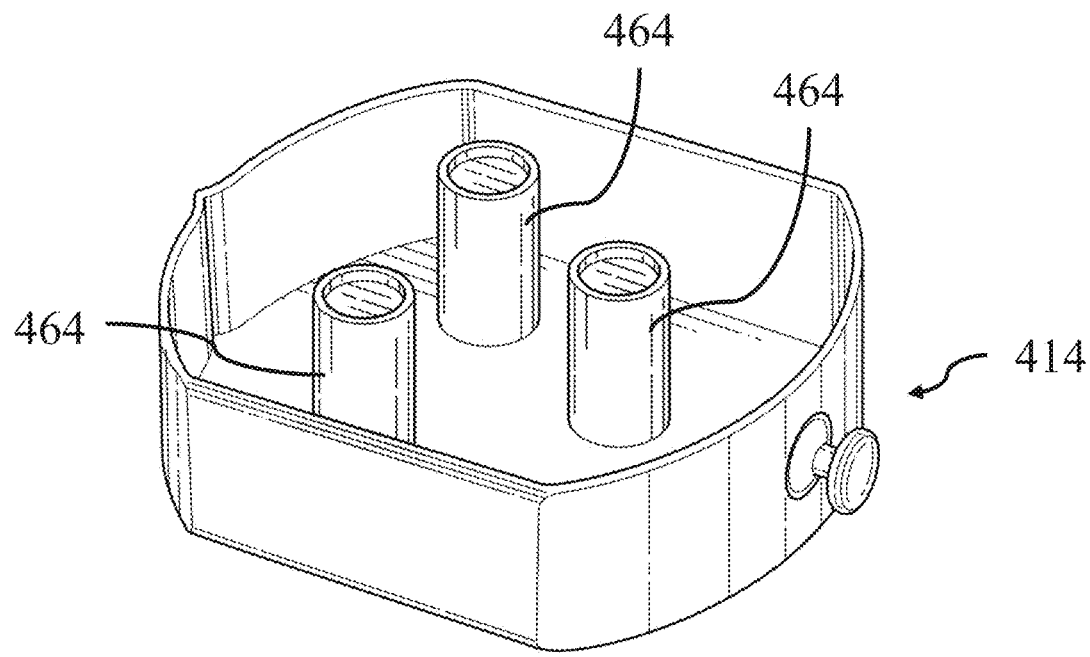
FIG. 20 is a perspective illustration of a basin portion with a plurality of elevated portions according to the eighth embodiment.
Figure 21:
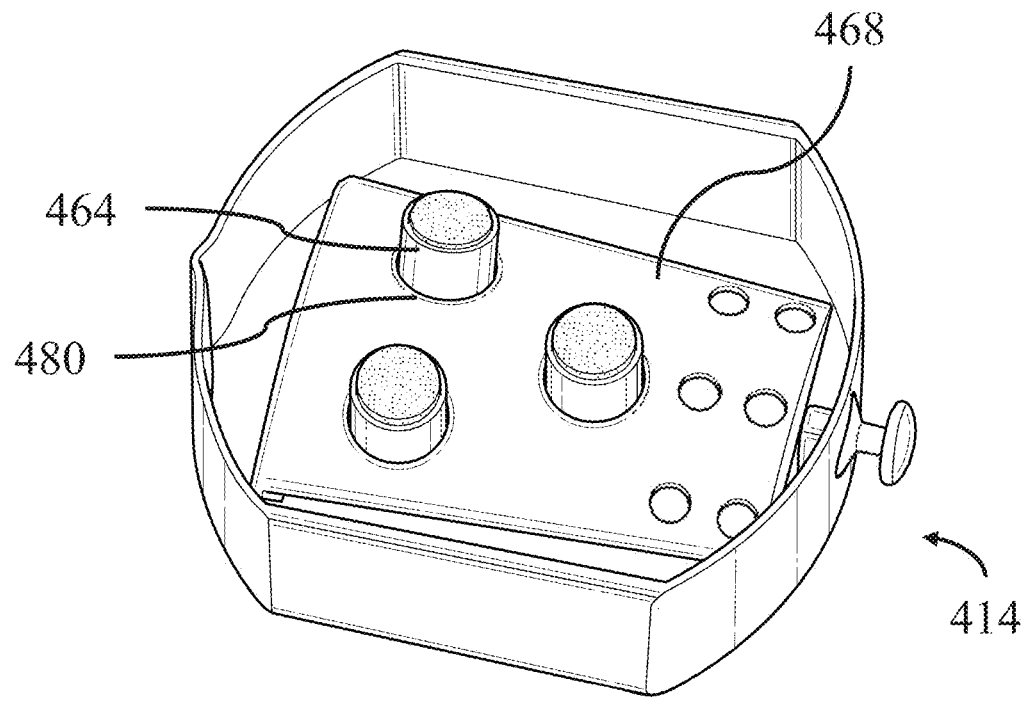
FIG. 21 is a perspective illustration of a watering accessory with a plurality of major holes and placed in the basin portion according to the eighth embodiment.

FIGS. 19-21 are perspective illustrations of a plant pot assembly 410 in accordance with an eighth embodiment of the disclosure. Unless otherwise indicated, the eighth embodiment may share all of the same features, elements, materials of construction, and functionalities of the other embodiments described herein. A plurality of drain apertures 460 are defined by the dividing structure 422 and connect the soil cavity 424 to the basin cavity 426. The plurality of drain apertures 460 may be disposed equidistance from each other, centrally, peripherally, or the like. A basin portion 414 includes a plurality of elevated portions 464 that are disposed such that each of the plurality of elevated portions 464 are in contact with one of the plurality of drain apertures 460. A watering accessory 468 includes a plurality of major holes 480 and minor holes 482. When placed within the basin portion 414, the plurality of the elevated portions 464 extend through the plurality of major holes 480.

Figure 22:
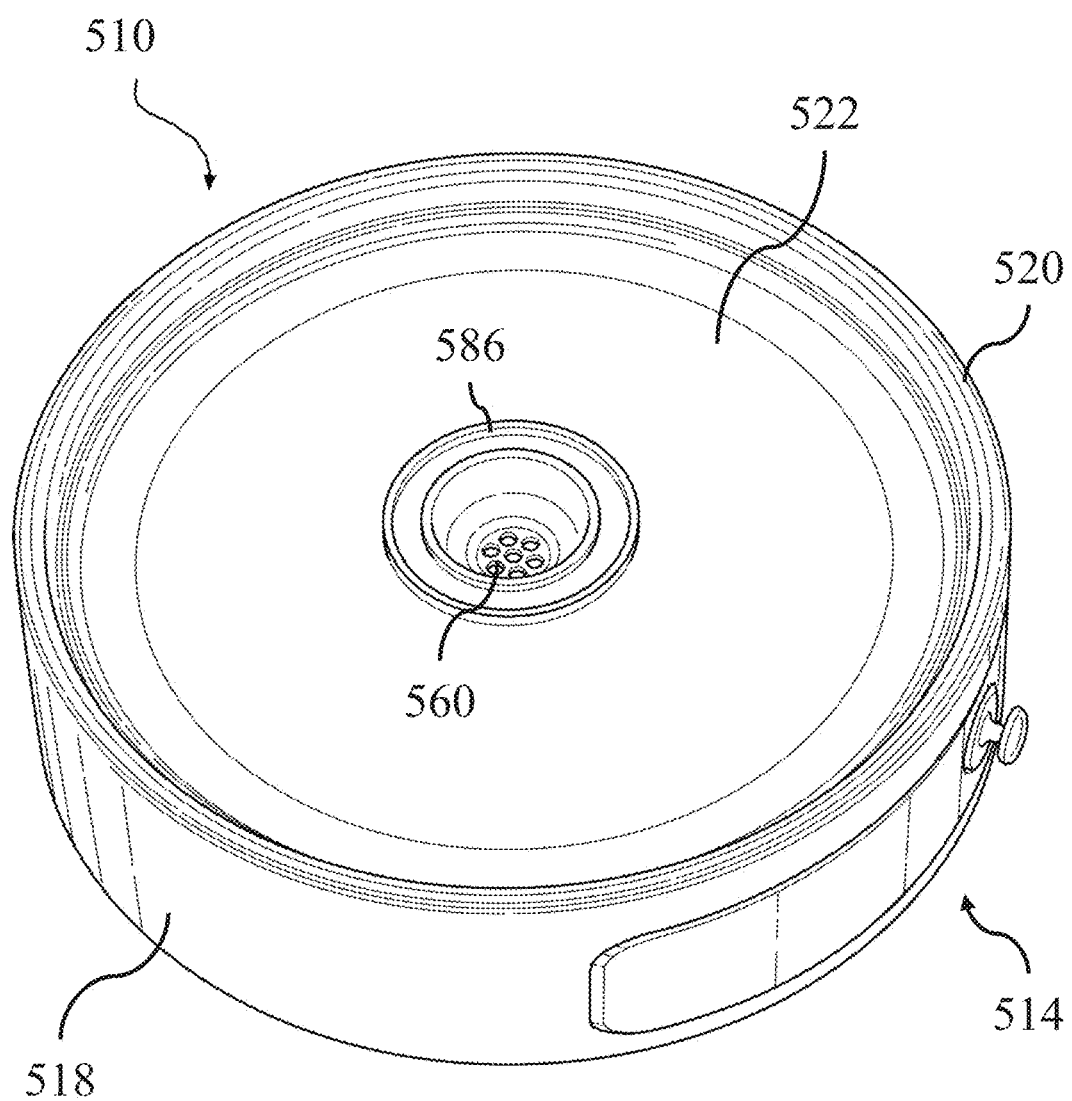
FIG. 22 is a perspective illustration of a plant pot platform assembly with a drain aperture and a gasket for providing a seal between a pot and the plant pot platform assembly according to a ninth embodiment of the disclosure.

FIG. 22 is a perspective illustration of a plant pot assembly 510 in accordance with a ninth embodiment of the disclosure. Unless otherwise indicated, the ninth embodiment may share all of the same features, elements, materials of construction, and functionalities of the other embodiments described herein. The plant pot assembly 510 includes at least one sidewall 518 extending upwardly from a base 516 to an upper rim 520. A dividing structure 522 is spaced between the base 516 (not shown) and the at least one sidewall 518. A plant pot may be placed on the dividing structure 522 and secured by the upper rim 520 and/or the at least one sidewall 518. In some embodiments, the plant pot assembly 510 may be a platform in which the dividing structure 522 is disposed proximal or adjacent to the upper rim 520. A gasket 586 surrounds the drain aperture 560 and provides a water-tight seal between the drain aperture 560 and the plant pot such that all fluid flowing through the plant pot flows into the drain aperture 560. Additionally, when the elevated portion of the basin portion 514 is in contact with the drain aperture 560 fluid will be prevented from flowing into the basin cavity, and when the elevated portion is not in contact with the drain aperture 560 fluid will be permitted to flow into the basin cavity.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

What is claimed is:

1. A plant pot assembly comprising:
   a pot portion comprising at least one sidewall extending upwardly from a sidewall bottom section to an upper rim and a dividing structure spaced between the sidewall bottom section and upper rim;
   the dividing structure, upper rim, and sidewalls defining a soil cavity;
   the dividing structure, bottom section, and the at least one sidewall defining a basin cavity;
   the dividing structure defining a drain aperture connecting the soil cavity and the basin cavity;
   a basin portion comprising a basin floor, a basin front, a basin back, at least one basin sidewall, and an elevated portion;
   the at least one sidewall defining an opening in the basin cavity whereby the basin portion is configured to be removably inserted into the basin cavity;
   wherein, in a first basin position in which the basin portion is disposed within the basin cavity, the elevated portion is configured to contact the drain aperture such that a fluid in the soil cavity is restricted from passing between the soil cavity and the basin cavity;
   wherein, in a second basin position in which the basin portion is also disposed within the basin cavity, the elevated portion is configured to not contact the drain aperture to allow the fluid in the soil cavity to pass between the soil cavity and the basin cavity through the drain aperture; and
   a watering accessory configured to be removably attached to the upper rim of the pot portion.

2. The plant pot assembly of claim 1, wherein the watering accessory comprises a folded edge adjacent to a top end of the watering accessory.

3. The plant pot assembly of claim 1, wherein the watering accessory comprises a hole spaced apart from a top end of the watering accessory.

4. The plant pot assembly of claim 3, wherein the watering accessory is configured to be removably placed within the basin portion; and
   wherein the elevated portion of the basin portion extends through the hole of the watering accessory.

5. The plant pot assembly of claim 1, wherein the watering accessory comprises a plurality of holes spaced apart from a top end of the watering accessory.

6. The plant pot assembly of claim 1, wherein the watering accessory is configured to direct water towards roots of a plant positioned in a lower section of the soil cavity.

7. The plant pot assembly of claim 1, wherein the elevated portion extends upwardly from the basin floor toward the dividing structure; and
   wherein the elevated portion is spaced apart from the basin front, the basin back, and the at least one basin sidewall.

8. The plant pot assembly of claim 7, wherein the elevated portion includes a compressible material;
   wherein the dividing structure includes a bottom surface that faces the bottom section and is angled downwardly from the sidewall bottom section to the drain aperture; and
   wherein in the first basin position the compressible material is compressed against the drain aperture.

9. The plant pot assembly of claim 1, further comprising tabs disposed inside of the soil cavity and extending upwardly toward the upper rim.

10. The plant pot assembly of claim 1, wherein the basin back defines a spout for pouring the fluid out of the basin portion.

11. The plant pot assembly of claim 1, wherein the basin front is recessed relative to the at least one sidewall when the basin portion is in the first basin position and is flush with the at least one sidewall when the basin is in the second basin position.

12. A plant pot assembly comprising:
   a pot portion comprising at least one sidewall extending upwardly from a sidewall bottom section to an upper rim and a dividing structure spaced between the sidewall bottom section and upper rim;
   the dividing structure, upper rim, and sidewalls defining a soil cavity;
   the dividing structure, bottom section, and sidewalls defining a basin cavity;
   the dividing structure defining a plurality of drain apertures connecting the soil cavity and the basin cavity;
   a basin portion comprising a basin floor, a basin front, a basin back, at least one basin sidewall, and a plurality of elevated portions;
   the at least one sidewall defining an opening in the basin cavity whereby the basin portion is configured to be removably inserted into the basin cavity;
   wherein, in a first basin position in which the basin portion is disposed within the basin cavity, the plurality of elevated portions are each configured to contact one of the plurality of drain apertures such that a fluid in the soil cavity is restricted from passing between the soil cavity and the basin cavity; and
   wherein, in a second basin position in which the basin portion is also disposed within the basin cavity, the plurality of elevated portions are each configured to not contact one of the plurality of drain apertures to allow the fluid in the soil cavity to pass between the soil cavity and the basin cavity through the drain aperture.

13. The plant pot assembly of claim 12, wherein the plurality of elevated portions extend upwardly from the basin floor toward the dividing structure; and
   wherein the plurality of elevated portions are spaced apart from the basin front, the basin back, and the at least one basin sidewall.

14. The plant pot assembly of claim 13, further comprising a watering accessory removably attachable to the upper rim of the pot portion, comprising a plurality of holes spaced apart from a top end of the watering accessory, and wherein the watering accessory is configured to direct water towards roots of a plant positioned in a lower section of the soil cavity.

15. The plant pot assembly of claim 14, wherein the watering accessory is configured to be removably placed within the basin portion; and wherein the plurality of elevated portions each extend through one of the plurality of holes.

16. The plant pot assembly of claim 13, wherein each of the plurality of elevated portions include a compressible material.

17. A plant pot platform assembly comprising:
a pot portion comprising at least one sidewall extending upwardly from a base to an upper rim and a dividing structure spaced between the base and the upper rim;
the dividing structure, the base, and the at least one sidewall defining a basin cavity;
the dividing structure defining a drain aperture in fluid communication with the basin cavity;
a basin portion comprising a basin floor, a basin front, a basin back, at least one basin sidewall, and an elevated portion extending upwardly from the basin floor toward the dividing structure; and
the at least one sidewall defining an opening in the basin cavity whereby the basin portion is configured to be removably inserted into the basin cavity;

wherein, in a first basin position in which the basin portion is disposed within the basin cavity, the elevated portion is configured to contact the drain aperture such that a fluid is restricted from passing into the basin cavity; and wherein, in a second basin position in which the basin portion is also disposed within the basin cavity, the elevated portion is configured to not contact the drain aperture to allow a fluid to pass into the basin cavity through the drain aperture.

18. The plant pot platform assembly of claim 17, further comprising a gasket surrounding the drain aperture for forming a water-tight seal with a pot placed on top of the dividing structure.

19. The plant pot platform assembly of claim 17, wherein the basin back defines a spout for pouring the fluid out of the basin portion.

20. The plant pot platform assembly of claim 17, wherein the basin front is recessed relative to the at least one sidewall when the basin portion is in the first basin position and is flush with the at least one sidewall when the basin is in the second basin position.

* * * * *